(12) United States Patent
Lee (10) Patent No.: US 11,338,682 B2
(45) Date of Patent: May 24, 2022

(54) METHOD AND APPARATUS FOR RECOMMENDING CLUSTER UI DESIGN USING DISTRIBUTION OF DESIGN ELEMENTS

(71) Applicant: Yellowknife Inc., Seoul (KR)

(72) Inventor: Han Sung Lee, Seoul (KR)

(73) Assignee: YELLOWKNIFE INC., Seoul (KR)

( * ) Notice: Subject to any disclaimer, the term of this patent is extended or adjusted under 35 U.S.C. 154(b) by 0 days.

(21) Appl. No.: 17/234,082

(22) Filed: Apr. 19, 2021

(65) Prior Publication Data

US 2021/0339630 A1 Nov. 4, 2021

(30) Foreign Application Priority Data

Apr. 29, 2020 (KR) .................. 10-2020-0052270

(51) Int. Cl.
*B60K 37/02* (2006.01)
*G06V 20/59* (2022.01)

(52) U.S. Cl.
CPC .............. *B60K 37/02* (2013.01); *G06V 20/59* (2022.01)

(58) Field of Classification Search
CPC ........ B60K 37/02; B60K 37/04; B60K 35/00; G06V 20/59; G09G 53/38
See application file for complete search history.

(56) References Cited

U.S. PATENT DOCUMENTS

| 9,463,694 | B1* | 10/2016 | Clark | B60K 35/00 |
| 11,267,399 | B2* | 3/2022 | Chang | B60Q 3/12 |
| 2013/0282240 | A1* | 10/2013 | Nada | B60K 35/00 701/42 |
| 2017/0162168 | A1* | 6/2017 | Lopez | B60K 37/02 |
| 2020/0105230 | A1* | 4/2020 | Jung | G06V 20/59 |

FOREIGN PATENT DOCUMENTS

KR 10-2019-0050227 A 5/2019

* cited by examiner

*Primary Examiner* — Omeed Alizada
(74) *Attorney, Agent, or Firm* — Maier & Maier, PLLC (57) ABSTRACT

Embodiments relate to an apparatus for recommending a cluster user interface (UI) design using a distribution of design elements including an eye position detection unit to detect an eye position of a driver from an image captured through a camera in a vehicle, a visible area determination unit to determine a visible area in a cluster based on the detected eye position, a position of the cluster in the vehicle and a position of a steering wheel, a cluster UI design search unit to search for a cluster UI design related to a shape of the determined visible area in a database, and a cluster management unit to recommend the found cluster UI designs to the driver and apply a cluster UI design selected by the driver from the recommended cluster UI designs to the cluster in the vehicle.

8 Claims, 12 Drawing Sheets

METHOD AND APPARATUS FOR RECOMMENDING CLUSTER UI DESIGN USING DISTRIBUTION OF DESIGN ELEMENTS

TECHNICAL FIELD

Embodiments relate to an apparatus and method for recommending a cluster user interface (UI) design using a distribution of design elements. More particularly, embodiments relate to technology that detects a visible area which is different for each driver and recommends a cluster UI design suited for the visible area.

BACKGROUND

In a vehicle, a cluster functions to display various information related to driving. For example, the cluster may display the conditions such as speed, engine RPM, remaining fuel quantity, coolant temperature, brake fluid, washer fluid, etc. Recently, the cluster is changed from analog to digital form, and with digitalization, a larger amount of information is displayed on the cluster and provided to a driver.

Meanwhile, since the steering wheel is positioned between the cluster screen and the driver, part of the cluster screen is hidden by the steering wheel. To solve this problem, Korean Patent Publication No. 10-2019-0050227 discloses technology that adjusts the position of the seat or the steering wheel. However, this method changes the driver's posture, causing fatigue to the driver.

Additionally, each driver may need a cluster design suited to his/her taste, but if a variety of cluster designs are arbitrarily applied, there is a high likelihood that the driver may not see important information when the important information is placed in the driver's visible area.

Accordingly, it may be necessary to apply a cluster UI design suited for the driver's visible area.

SUMMARY

The present disclosure is aimed at providing a cluster user interface (UI) design with a cluster design UI element positioned in a visible area as much as possible, not an area invisible to a driver due to part of the cluster screen hidden by the steering wheel.

The present disclosure is aimed at recommending the cluster UI design considering the type or function of the cluster design element that will be displayed in the visible area.

The present disclosure is aimed at recommending the cluster UI design based on the area of overlap or the nature of the design element included in the overlapping area by comparing the visible area with the area of the cluster UI design element.

The present disclosure is aimed at recommending the cluster UI design by dividing the area of the cluster screen into a monocular visible area and a binocular visible area, or using the vision of the left and right eyes.

The technical problem of the present disclosure is not limited to those mentioned above, and another technical problem not mentioned herein will be clearly understood by those skilled in the art from the following description.

An apparatus for recommending a cluster user interface (UI) design using a distribution of design elements according to an embodiment of the present disclosure includes an eye position detection unit to detect an eye position of a driver from an image captured through a camera in a vehicle, a visible area determination unit to determine a visible area in a cluster based on the detected eye position, a position of the cluster in the vehicle and a position of a steering wheel, a cluster UI design search unit to search for a cluster UI design related to a shape of the determined visible area in a database, and a cluster management unit to recommend the found cluster UI designs to the driver and apply a cluster UI design selected by the driver from the recommended cluster UI designs to the cluster in the vehicle.

In a preferred embodiment, the apparatus for recommending a cluster UI design using a distribution of design elements may further include a design data processing unit to process the cluster UI design stored in the database, and the design data processing unit may extract position information of display information included in the cluster UI design stored in the database, and generate an display information distribution map in the cluster using the extracted position information of the display information, and the cluster UI design search unit may select the cluster UI design by comparing the generated display information distribution map with the shape of the visible area.

In a preferred embodiment, the design data processing unit may generate the display information distribution map by reflecting importance of each display information, and the importance of the display information may be determined based on whether a function represented by the display information is related to safety.

In a preferred embodiment, the cluster UI design search unit may determine a relevance of the cluster UI design based on a similarity between the display information distribution map and the shape of the visible area and the importance of the display information, and the cluster management unit may recommend a list of some of the cluster UI designs in the database based on the relevance to the driver.

In a preferred embodiment, the eye position detection unit may detect the eye position of each of left and right eyes of the driver, and the visible area determination unit may divide the visible area in the cluster into a binocular visible area and a monocular visible area.

In a preferred embodiment, the cluster UI design search unit may determine a relevance of the cluster UI design based on a similarity between the display information distribution map and the shape of the visible area, and when determining the similarity, determine a weight for the monocular visible area to be lower than a weight for the binocular visible area, and the cluster management unit may recommend a list of some of the cluster UI designs in the database to the driver based on the relevance.

A method for recommending a cluster UI design using a distribution of design elements according to an embodiment of the present disclosure is performed by a computer, and the method may include detecting an eye position of a driver from an image captured through a camera in a vehicle, determining a visible area in a cluster based on the detected eye position, a position of the cluster in the vehicle and a position of a steering wheel, searching for a cluster UI design related to a shape of the determined visible area in a database, and recommending the found cluster UI designs to the driver and applying a cluster UI design selected by the driver from the recommended cluster UI designs to the cluster in the vehicle.

A computer program according to an embodiment of the present disclosure may be stored in a computer-readable recording medium to perform the method and may be executed in combination with hardware.

According to an embodiment of the present disclosure, it is possible to provide a cluster UI design with a cluster design user interface (UI) element positioned in a visible area as much as possible, not an area invisible to a driver due to part of the cluster screen hidden by the steering wheel.

According to an embodiment of the present disclosure, it is possible to recommend the cluster UI design considering the type or function of the cluster design element that will be displayed in the visible area.

Additionally, according to an embodiment, it is possible to recommend the cluster UI design based on the area of overlap or the nature of the design element included in the overlapping area by comparing the visible area with the area of the cluster UI design element.

Furthermore, according to an embodiment, it is possible to recommend the cluster UI design by dividing the area of the cluster screen into a monocular visible area and a binocular visible area, or using the vision of the left and right eyes.

The effect of the present disclosure described herein is not limited to those described above, and it should be understood that the effect of the present disclosure may be expanded to a variety of effects that may be derived from the following detailed description of the embodiments of the present disclosure.

DETAILED DESCRIPTION OF THE EMBODIMENTS

In describing an embodiment of the present disclosure, when a certain description of well-known elements or functions is deemed to make the subject matter of an embodiment of the present disclosure ambiguous, its detailed description is omitted herein. Additionally, in the drawings, elements irrelevant to the description of an embodiment of the present disclosure are omitted herein, and like reference signs are affixed to like elements.

In an embodiment of the present disclosure, when an element is referred to as being "connected", "coupled" or "linked" to another element, this may include not only a direct connection relationship but also an indirect connection relationship in which intervening elements are present. Additionally, unless expressly stated to the contrary, "comprise" or "include" when used in this specification, specifies the presence of stated elements but does not preclude the presence or addition of one or more other elements.

In an embodiment of the present disclosure, the terms "first", "second" and the like are used to distinguish an element from another, and do not limit the order or importance between elements unless otherwise mentioned. Accordingly, a first element in an embodiment may be referred to as a second element in other element within the scope of embodiments of the present disclosure, and likewise, a second element in an embodiment may be referred to as a first element in other embodiment.

In an embodiment of the present disclosure, the distinguishable elements are intended to clearly describe the feature of each element, and do not necessarily represent the separated elements. That is, a plurality of elements may be integrated into one hardware or software, and an element may be distributed to multiple hardware or software. Accordingly, although not explicitly mentioned, the integrated or distributed embodiment is included in the scope of embodiments of the present disclosure.

In the specification, a network may be a concept including a wired network and a wireless network. In this instance, the network may be a communication network that allows data exchange between a device and a system and between devices, and is not limited to a particular network.

The embodiment described herein may have aspects of entirely hardware, partly hardware and partly software, or entirely software. In the specification, "unit", "apparatus" or "system" refers to a computer related entity such as hardware, a combination of hardware and software, or software. For example, the unit, module, apparatus or system as used herein may be a process being executed, a processor, an object, an executable, a thread of execution, a program and/or a computer, but is not limited thereto. For example, both an application running on a computer and the computer may correspond to the unit, module, apparatus or system used herein.

Additionally, the device as used herein may be a mobile device such as a smartphone, a tablet PC, a wearable device and a Head Mounted Display (HMD) as well as a fixed device such as a PC or an electronic device having a display function. Additionally, for example, the device may be an automotive cluster or an IoT (Internet of Things) device. That is, the device as used herein may refer to devices on which an application can run, and is not limited to a particular type. In the following description, for convenience of description, a device on which an application runs is referred to as the device.

In the present disclosure, there is no limitation in the communication method of the network, and a connection between each element may not be made by the same network method. The network may include a communication method using a communication network (for example, a mobile communication network, a wired Internet, a wireless Internet, a broadcast network, a satellite network, etc.) as well as near-field wireless communication between devices. For example, the network may include all communication methods that enable networking between objects, and is not limited to wired communication, wireless communication, 3G, 4G, 5G, or other methods. For example, the wired and/or wireless network may refer to a communication network by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (WiMAX) or communication using ultrasonic waves, but is not limited thereto.

The elements described in a variety of embodiments are not necessarily essential, and some elements may be optional. Accordingly, an embodiment including some of the elements described in the embodiment is also included in the scope of embodiments of the present disclosure. Additionally, in addition to the elements described in a variety of embodiments, an embodiment further including other elements is also included in the scope of embodiments of the present disclosure.

Hereinafter, the embodiments of the present disclosure will be described in detail with reference to the accompanying drawings.

Figure 1:
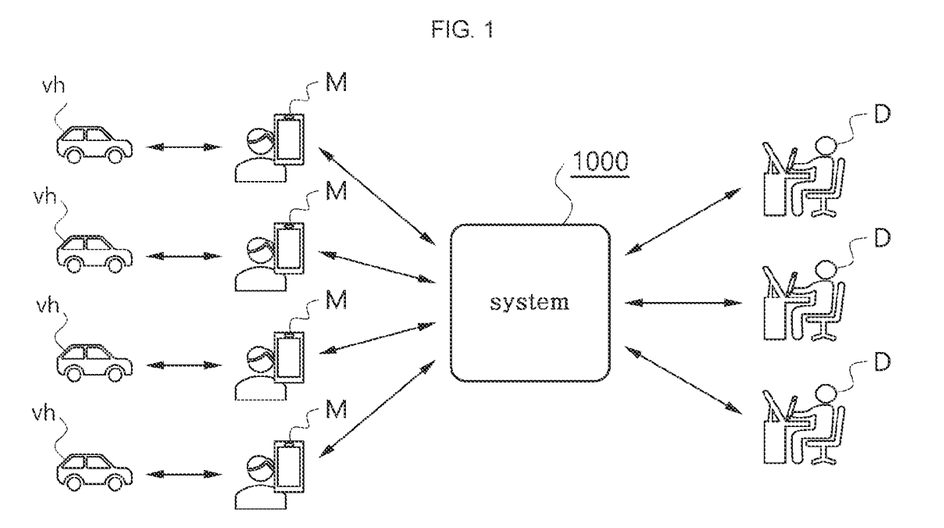
FIG. 1 shows an operating environment of a design management system (Aurora System™) which manages cluster user interface (UI) design elements according to an embodiment of the present disclosure.

FIG. 1 shows an operating environment of a design management system 1000 (Aurora System™) which manages cluster user interface (UI) design elements according to an embodiment of the present disclosure. Referring to FIG. 1, the design management system 1000 may receive a cluster related design from a plurality of designers D. The "cluster related design" may include a user interface design (hereinafter, a cluster UI design) displayed on a vehicle cluster vh and/or a corresponding user interface design (hereinafter, a smartphone UI design) of a user device M (for example, a smartphone).

The cluster UI design and the smartphone UI design may include a plurality of display information (design elements), and the display information may be dynamically changed. Additionally, the display information may be changed through user interaction. For example, the display information that constitutes the cluster UI design may be any aesthetic image or functional image showing a specific function. The functional image may include the automotive speedometer, RPM, fuel level, coolant, open door, weather and navigation information, but is not limited thereto.

The cluster related design created by the designer may be received and managed by the design management system 1000 through a web or an app provided by the design management system 1000. Additionally, the design management system 1000 may provide the cluster related design to the user device or an automotive system (directly or via the user device) through the web or the app. Additionally, the provided cluster related design may be modified or complemented by the designer or the design management system and may be updated.

When a variety of cluster related designs are provided to the user, the user may choose a desired cluster related design and apply it to his/her smartphone or the cluster.

Meanwhile, a steering wheel is positioned between a cluster screen and a driver, and part of the driver's view is hidden by the steering wheel, and since very various cluster UI designs are provided by the design management system 1000, it is impossible to predict the state or type of display information hidden by the steering wheel.

Figure 2:
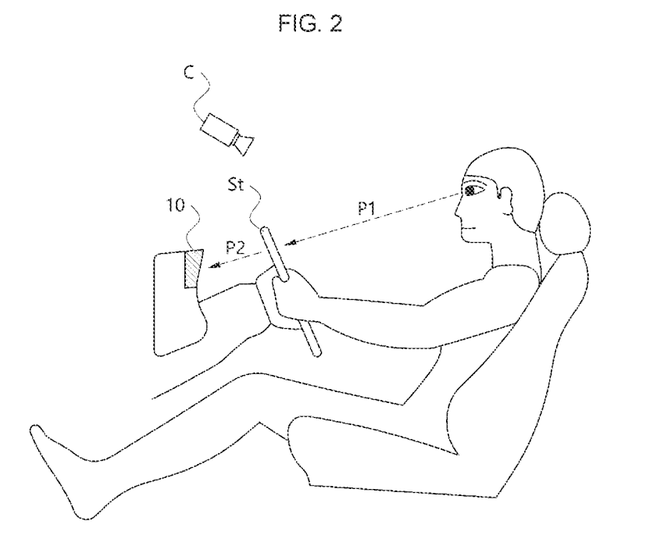
FIG. 2 is a diagram showing a relationship between a driver, a steering wheel and a cluster in a vehicle.

FIG. 2 is a diagram showing a relationship between the driver, the steering wheel St and the cluster 10 in the vehicle. Referring to FIG. 2, when the driver's view is hidden by the steering wheel, the driver can only see an area by a gaze path P2, not P1.

The design management system 1000 according to an embodiment of the present disclosure may provide a method for recommending a cluster UI design using a distribution of design elements, a computer program or an apparatus for performing the same.

Figure 3:
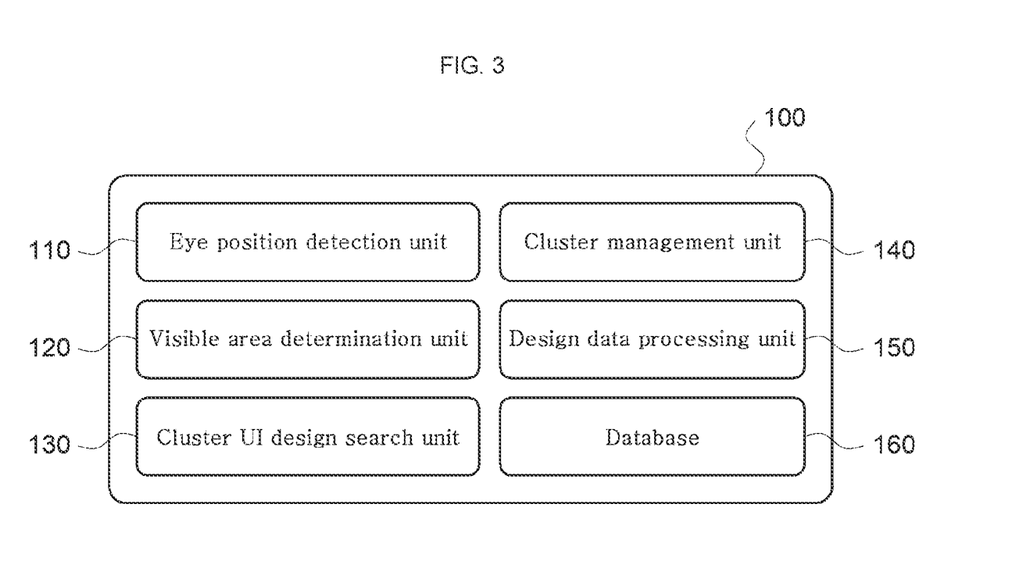
FIG. 3 is a block diagram of an apparatus for recommending a cluster UI design using a distribution of design elements according to an embodiment of the present disclosure.
Figure 4A:
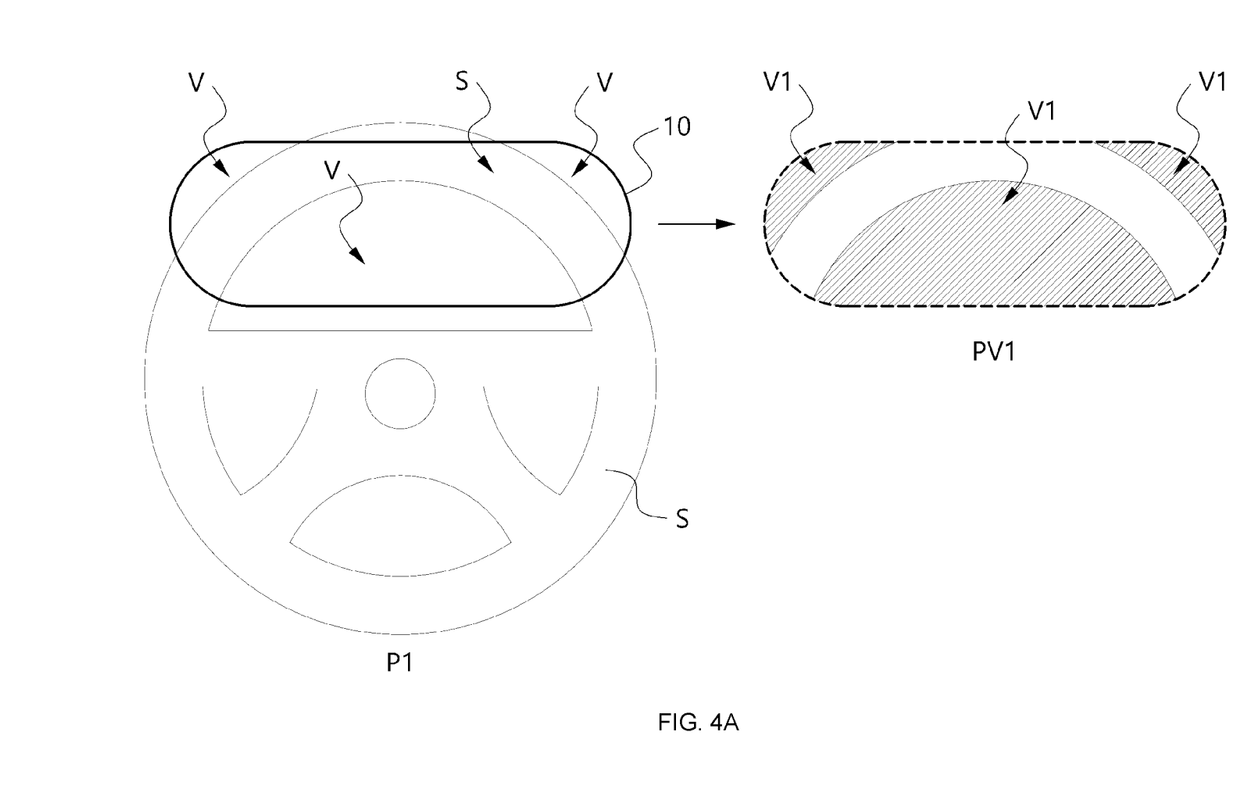
FIG. 4A is a diagram for describing the shape of a visible area on a cluster hidden by a steering wheel in a variety of positions and postures in a variety of embodiments of the present disclosure.
Figure 4B:
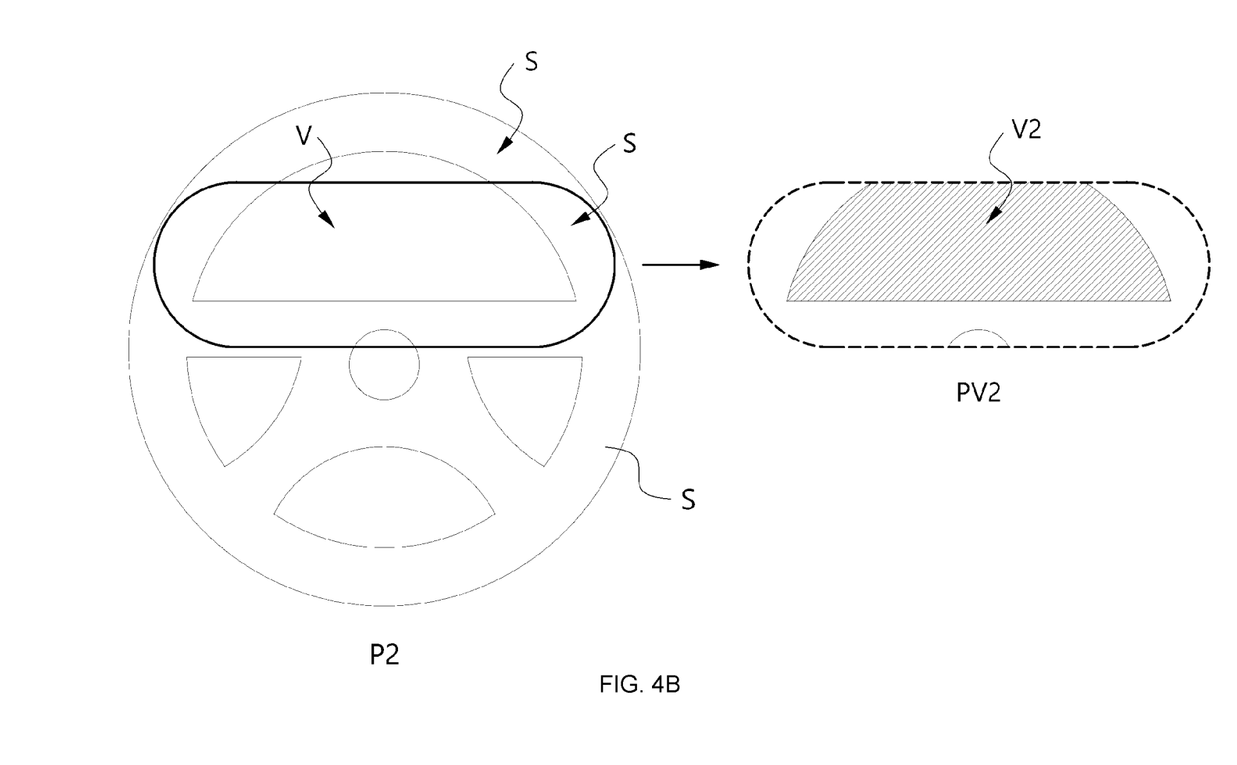
FIG. 4B is a diagram for describing the shape of a visible area on a cluster hidden by a steering wheel in a variety of positions and postures in a variety of embodiments of the present disclosure.
Figure 4C:
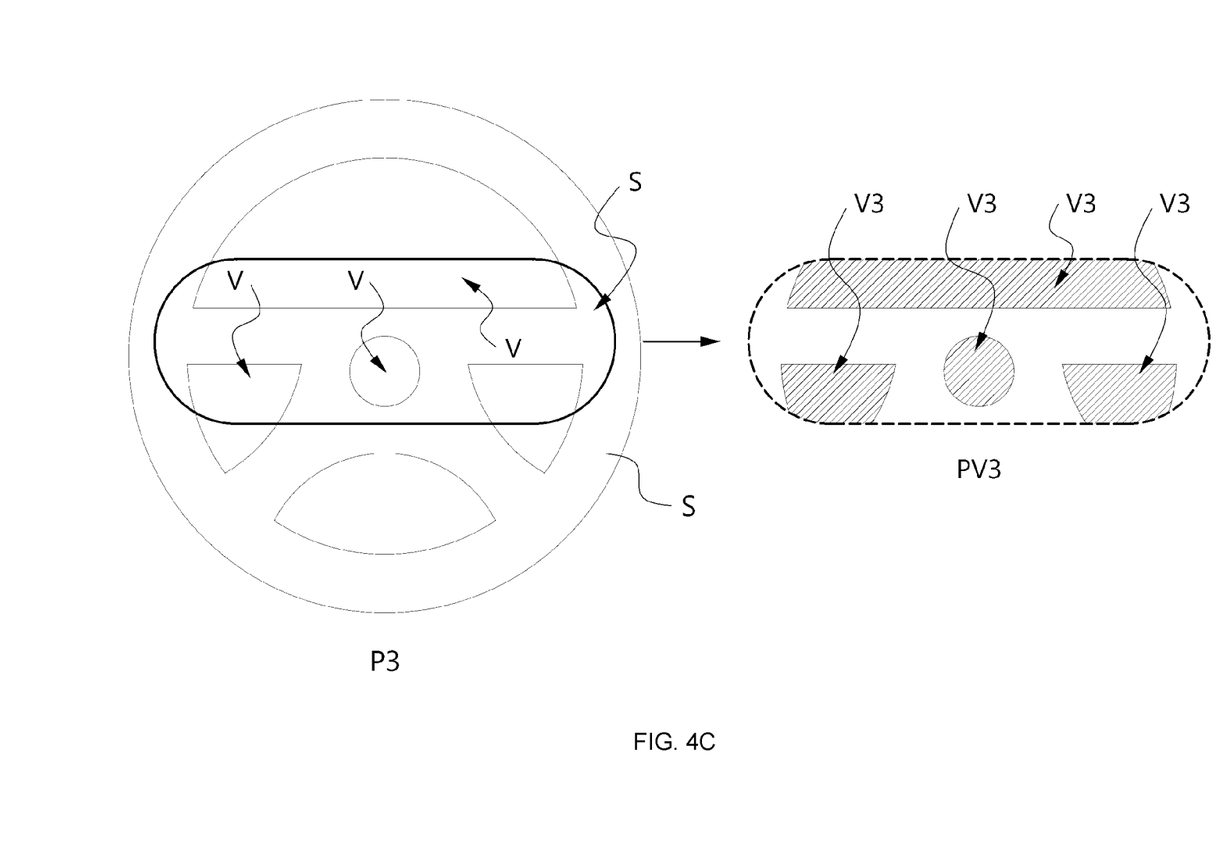
FIG. 4C is a diagram for describing the shape of a visible area on a cluster hidden by a steering wheel in a variety of positions and postures in a variety of embodiments of the present disclosure.
Figure 4D:
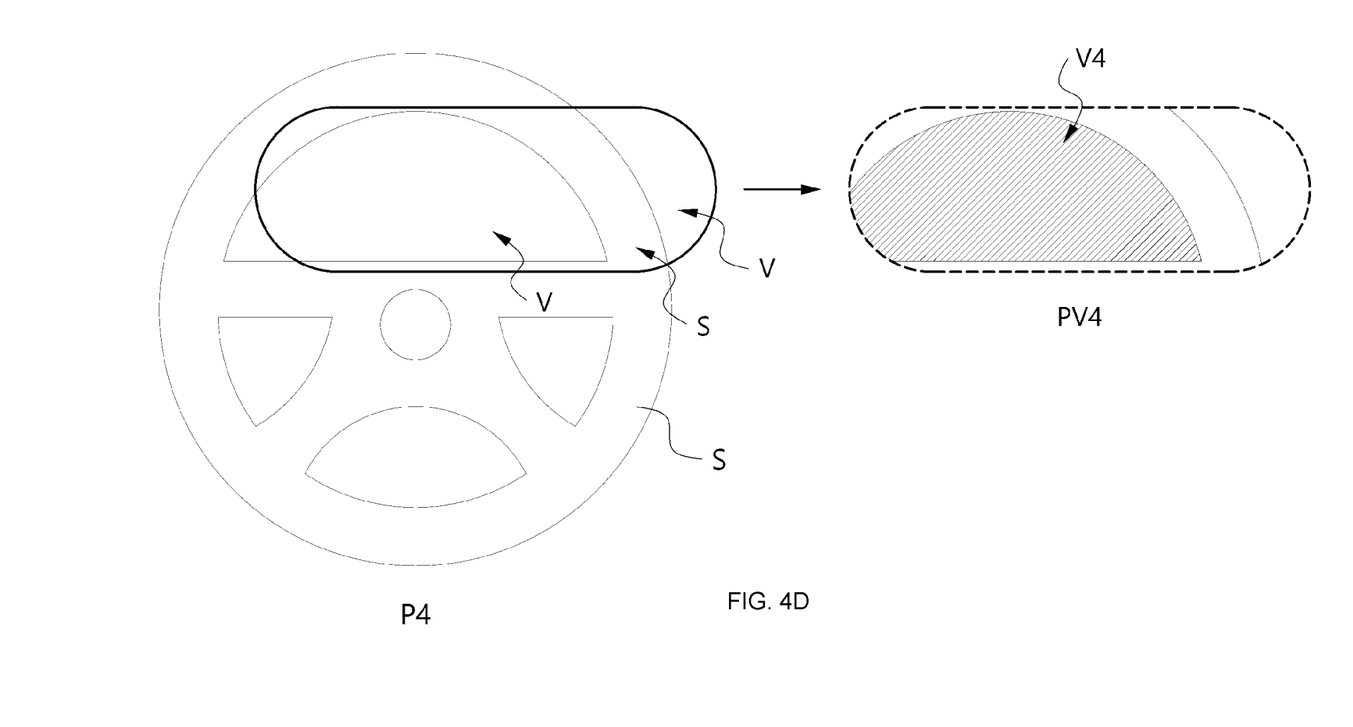
FIG. 4D is a diagram for describing the shape of a visible area on a cluster hidden by a steering wheel in a variety of positions and postures in a variety of embodiments of the present disclosure.

FIG. 3 is a block diagram of an apparatus for recommending a cluster UI design using a distribution of design elements according to an embodiment of the present disclosure. The apparatus 100 for recommending a cluster UI design using a distribution of design elements may be included in the design management system 1000, i.e., an external server that is separate from the vehicle, or a control system inside the vehicle, but is not limited thereto.

Referring to FIG. 3, the apparatus 100 for recommending a cluster UI design using a distribution of design elements may include an eye position detection unit 110, a visible area determination unit 120, a cluster UI design search unit 130 and a cluster management unit 140, and in other embodiments, may further include a design data processing unit 150 and/or a database (DB) 160. The database 160 may store the cluster related design and its updates.

In other embodiments, the apparatus 100 may include more components than those of FIG. 3 according to the nature of the apparatus applied. For example, the apparatus 100 may further include a variety of components such as a transceiver, a Global Positioning System (GPS) module, an acceleration sensor or a gyro sensor, various types of physical buttons, buttons using a touch panel, input/output ports and a vibrator for vibration.

In an embodiment of the present disclosure, the eye position detection unit 110 may detect the driver's eye position from a face image captured through a camera c (see FIG. 2) in the vehicle.

The camera c may be any image processing device that digitalizes an external image through an image sensor. The camera c may be a charge-coupled device (CCD) camera, but is not limited thereto. Additionally, the camera c may be a mono camera or a stereo camera, and may be mounted on the front, lateral or rear side of the driver.

The eye position detection unit 110 may detect the 3-dimensional position of the driver's eyes in the vehicle using the position of the camera in the vehicle and the image acquired through the camera. For example, the eye position detection unit 110 may detect the eye position of each of the left and right eyes of the driver.

The visible area determination unit 120 may determine a visible area and an invisible area in the cluster based on the detected eye position, the position of the cluster in the vehicle and the position of the steering wheel. In more detail, the visible area determination unit 120 may determine the visible area and the invisible area further using the shape of the cluster (the shape of the screen) and the shape of the steering wheel. Information about the shape of the cluster and the shape and position of the steering wheel may be received from the sensor in the vehicle or the user.

FIGS. 4A to 4D are diagrams for describing the shape of the visible area on the cluster 10 hidden by the steering wheel in a variety of positions and postures in a variety of embodiments of the present disclosure. Referring to FIGS. 4A to 4D (hereinafter FIG. 4), it can be seen that visible areas of various shapes are formed depending on the position and direction hidden by the steering wheel.

More specifically, in FIG. 4, the left part shows an invisible area s and a visible area v on the cluster, and the right part shows visible area maps pv1-pv4 of the visible areas v1-v4 shaded at corresponding angles. For example, it can be seen that the visible area map pv1 includes three visible areas v1 spaced apart from each other, the visible area map pv2 includes one visible area, and the visible area map pv3 includes four visible areas. That is, it can be seen that the shape of the visible area on the cluster varies for each driver depending on the driver's sitting height, the slope of the seat and the position of the steering wheel.

Figure 5:
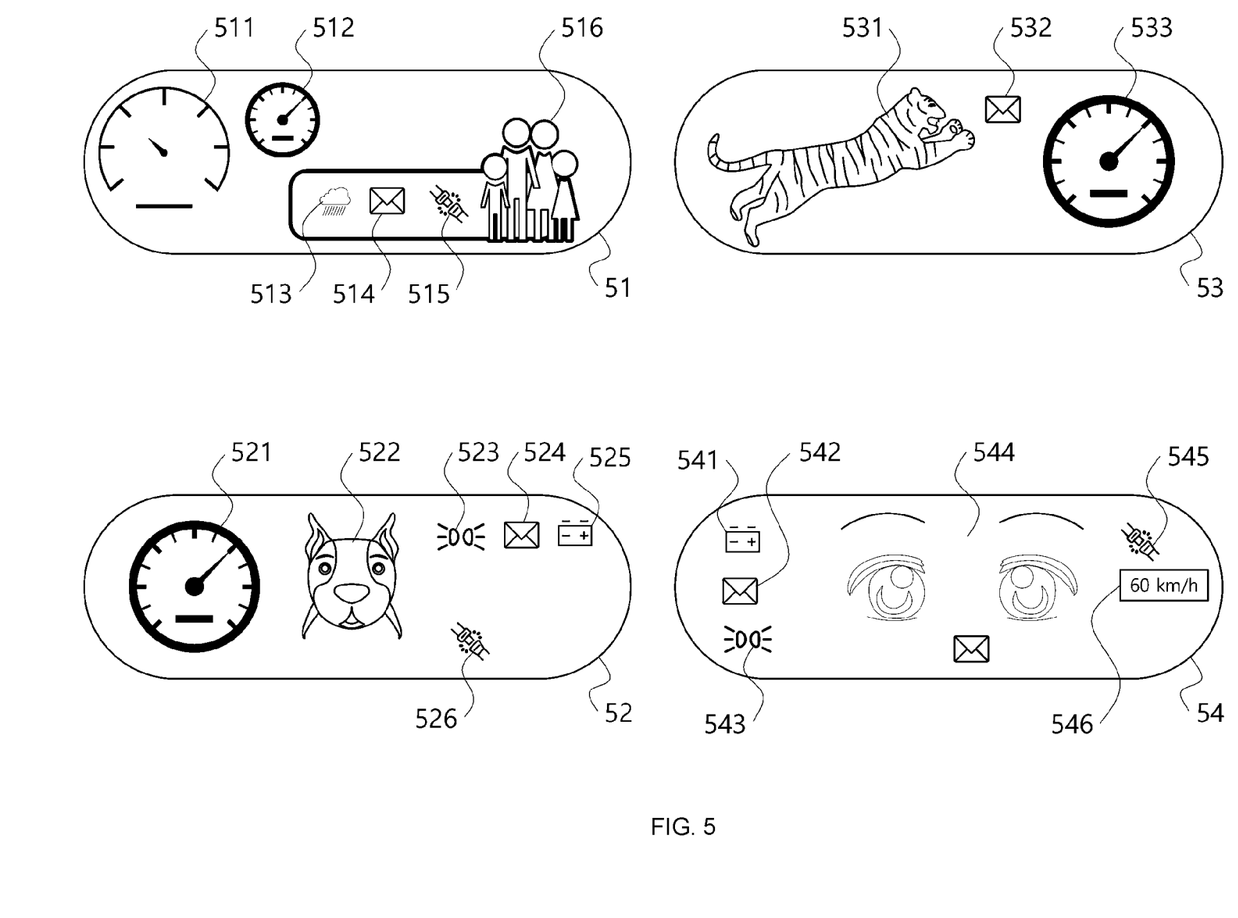
FIG. 5 shows an example of cluster UI designs received from a variety of designers and stored in a database according to an embodiment of the present disclosure.

FIG. 5 shows an example of cluster UI designs 51, 52, 53, 54 received from a variety of designers and stored in the database according to an embodiment of the present disclosure. The designers may select and design the design elements 511, 512, 513, 514, 521, 522, 523, 524, 531, 532, 533, 541, 542, 543 to display on the cluster UI design according to their styles. Accordingly, a certain cluster UI design includes seatbelt design elements 515, 526, 545 while a certain cluster UI may not include them. The seatbelt design element is displayed or not (included in the cluster UI design or not) for illustration purpose, and an always design element required by the law must be displayed in accordance with the law.

Additionally, each design element may be classified into an essential function design element, an optional function design element and a decorative design element according to the function or importance. The essential function design element is related to safety and may include a seatbelt design element 515 and battery design elements 525, 541, and the optional function design element is not essential to safety but helpful for the driver and may include a weather design element 513, a speedometer design element 511 and an email design element 514. The decorative design element is a design element that does not include a function and is formed for an aesthetic purpose only, and 516, 531, 522, 544 in FIG. 5 may correspond to the decorative design element.

Additionally, the classification criterion for essential and optional described herein may be set by the user or a manager and is not fixed by a specific rule.

In an embodiment, the cluster UI design search unit 130 may search for a cluster UI design related to the shape of the determined visible area (or the visible area map) in the database. Subsequently, the cluster management unit 140 may recommend the found cluster UI designs to the driver, and apply a cluster UI design selected by the driver from the recommended cluster UI designs to the cluster in the vehicle.

Figure 6:
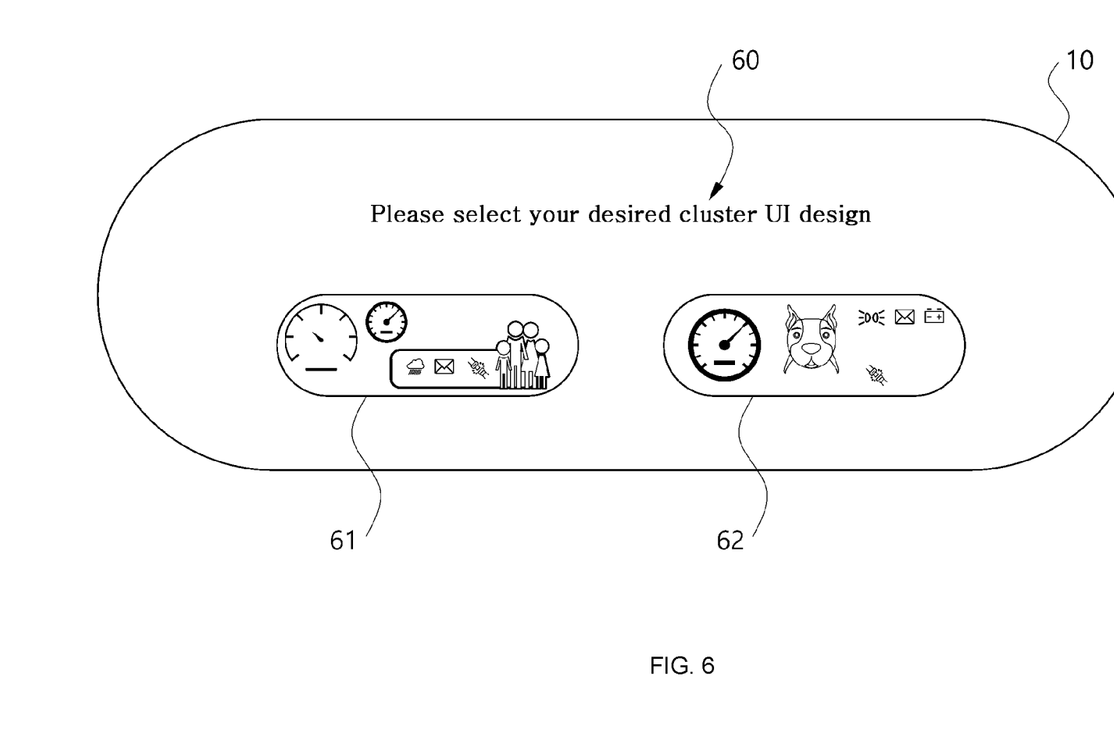
FIG. 6 shows cluster UI design recommendations provided to a driver according to an embodiment of the present disclosure.

FIG. 6 shows cluster UI design recommendations provided to the driver according to an embodiment of the present disclosure. Referring to FIG. 6, when the cluster UI design search unit 130 detects the driver's visible area shape (visible area map) and provides its corresponding cluster UI designs (candidate cluster UI designs), the cluster management unit 140 may display them on the cluster 10 and request 60 the driver to select. The driver may select at least one of the provided candidate cluster UI designs 61, 62 (directly select, or automatically select the top ranking recommendation, or change in a sequential order).

Hereinafter, a method of selecting a cluster UI design suited for the driver from the plurality of cluster UI designs stored in the database 160 based on the visible area map will be described in detail.

In an embodiment of the present disclosure, the design data processing unit 150 may process the cluster UI design stored in the database 160. For example, the design data processing unit 150 may extract position information of display information included in the cluster UI design stored in the database, and generate a display information distribution map in the cluster using the extracted position information of display information. Subsequently, the cluster UI design search unit 130 may select a cluster UI design by comparing the generated display information distribution map with the shape of the visible area.

Figure 7A:
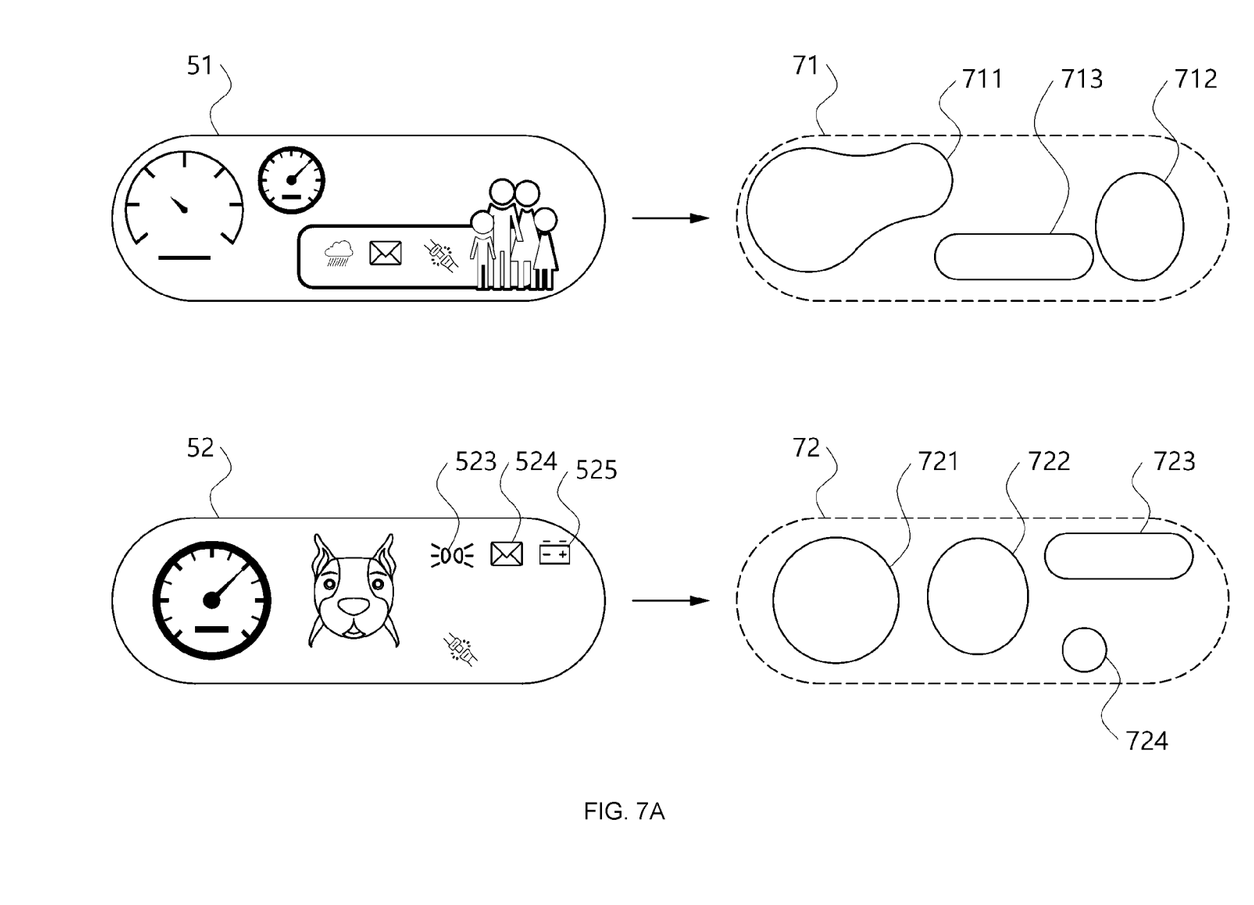
FIG. 7A shows display information distribution maps generated for each cluster UI design by a design data processing unit in an embodiment of the present disclosure.
Figure 7B:
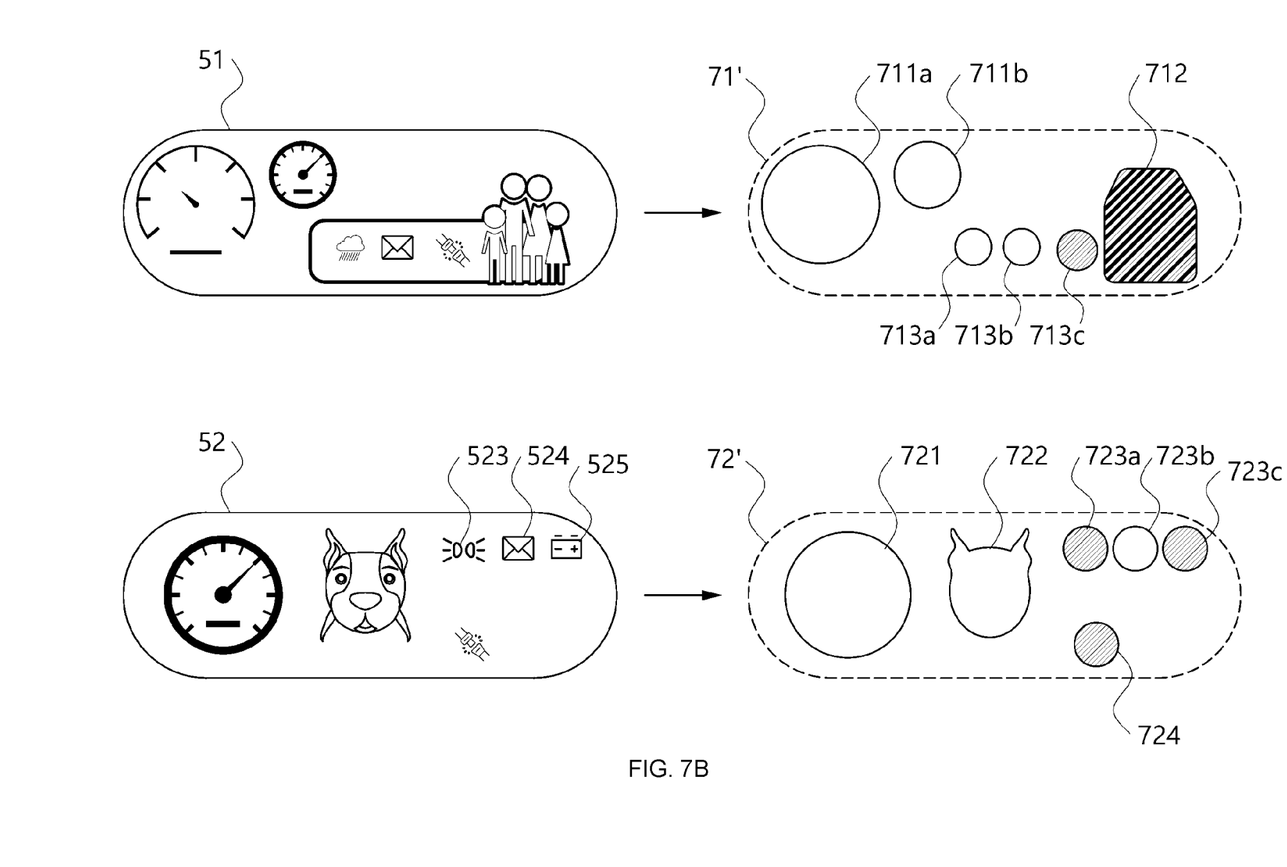
FIG. 7B shows display information distribution maps generated for each cluster UI design by a design data processing unit in an embodiment of the present disclosure.

FIGS. 7A and 7B show the display information distribution maps 71, 71', 72, 72' generated for each cluster UI design by the design data processing unit 150 according to an embodiment of the present disclosure.

The design data processing unit 150 may generate the design element distribution maps 71, 72 related to the area occupied by each design element based on the position, shape and size of each design element included in the cluster UI designs 51, 52. The design element distribution maps 71, 72 may include coverage areas 711, 712, 713, and coverage areas 721, 722, 723, 724 that cover each design element, respectively.

The generation of the coverage area by the design data processing unit may be accomplished for each design element (71', 72' in FIG. 7B), or may be accomplished by integrating adjacent design elements (711, 713, 723 in FIG. 7A). Additionally, in other embodiment, the generation of the coverage area by the design data processing unit may be accomplished by grouping based on the functions (the above-described essential, optional and decorative functions) of the design elements, but the present disclosure is not limited thereto.

Referring to FIG. 7A, for the cluster UI design 51, the speedometer design element and the RPM gauge design element are grouped into one to form the coverage area 711, and for the cluster UI design 52, the speedometer design element and the decorative design element are grouped into the coverage areas 721, 722, respectively.

Referring to FIG. 7B, all the design elements of the cluster UI design 51 individually have coverage areas. Additionally, each coverage area is distinguishable from another coverage area according to the type of the design element included in each coverage area.

For example, the coverage area 713c covers the seatbelt design element and is classified as an essential function element, and thus its importance is evaluated higher than those of the other coverage areas 713a, 713b for use in the cluster UI design search.

Likewise, the coverage area 712 only includes aesthetic design and thus its importance is evaluated lower than those of the other coverage areas 713*a*, 713*b* for use in the cluster UI design search.

Figure 8:
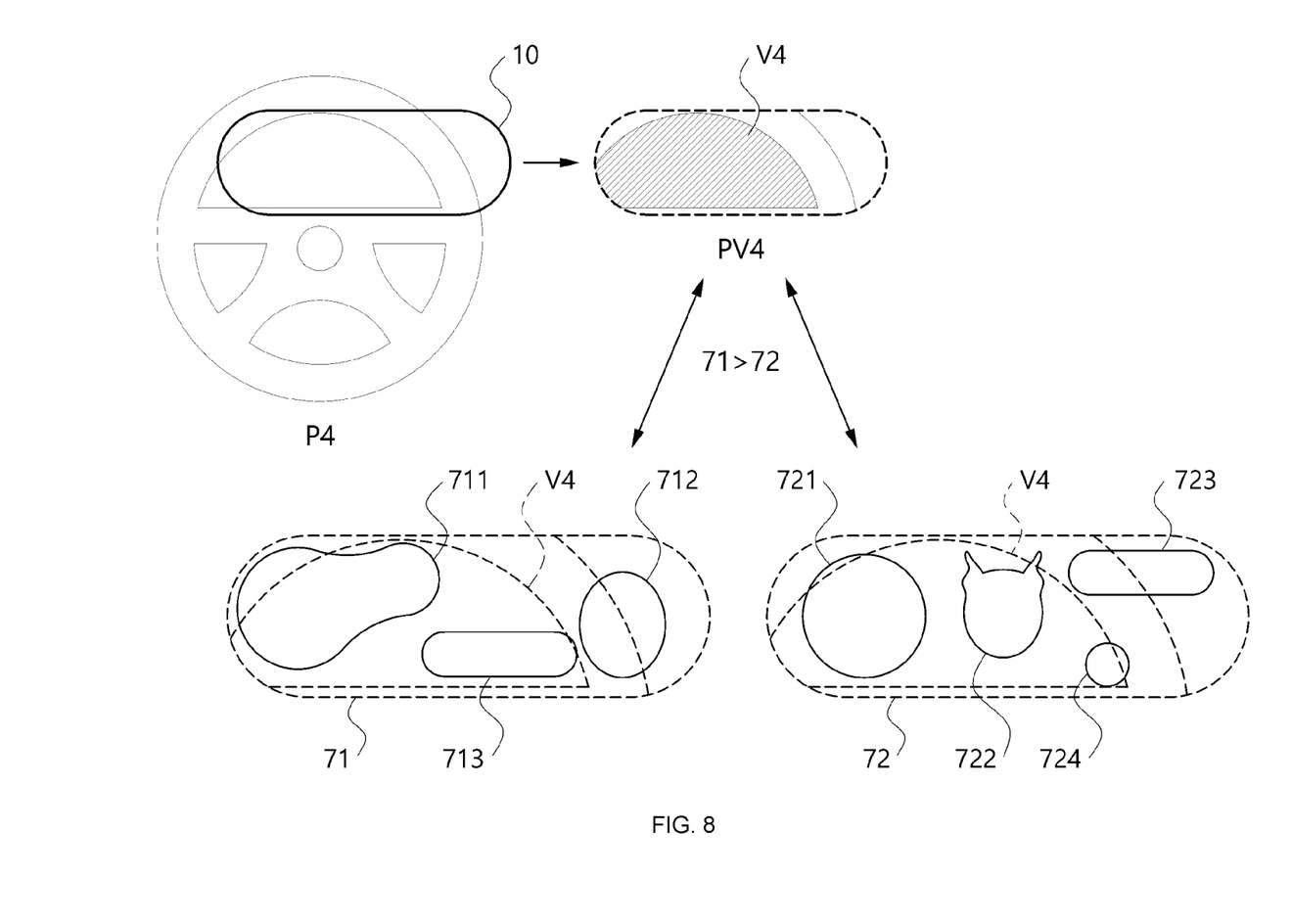
FIG. 8 shows an example of comparison between a visible area and a cluster UI design by a cluster UI design search unit according to an embodiment of the present disclosure.

FIG. 8 shows an example of comparison between the visible area with the cluster UI design by the cluster UI design search unit according to an embodiment of the present disclosure. In an example, the cluster UI design search unit 130 may select a cluster UI design by comparing the generated display information distribution maps 71, 72 with the shape v4 of the visible area.

Referring to FIG. 8, the cluster UI design search unit 130 may compare the shape v4 of the visible area currently for the driver with the design element distribution maps 71, 72 of the cluster UI designs stored in the database, calculate a similarity according to the match ratio, and derive a search result based on the similarity.

For reference, the design element distribution map 71 includes the plurality of coverage areas 711, 712, 713, and the design element distribution map 72 includes the plurality of coverage areas 721, 722, 723, 724. Additionally, each coverage area is generated by a predetermined criterion, and each coverage area may be generated by grouping the design elements into smaller or larger groups.

Referring further to FIG. 8, the cluster UI design search unit 130 may calculate the similarity between the shape of the visible area and the cluster UI design based on the range of overlap between the shape v4 of the visible area currently for the driver and each of the design element distribution maps 71, 72. The similarity may be calculated based on the area of the coverage area overlapping the shape of the visible area or the type of the design element in the coverage area (the essential function, the optional function, decoration). In FIG. 8, in the design element distribution map 71, almost the entire coverage area 712 except part of the coverage area 712 is included in the shape v4 of the visible area, while in the design element distribution map 72, the coverage area 723 is not included in the shape v4 of the visible area and part of the coverage area 724 is not included in the shape v4 of the visible area, either. In this case, the cluster UI design search unit 130 may calculate the similarity by comparing the sum of each coverage area included in the shape v4 of the visible area. For example, when the sum of coverage areas included in the shape v4 of the visible area is 100 in the case of the design element distribution map 71 and 92 in the case of the design element distribution map 72, the cluster UI design search unit 130 may first derive the cluster UI design of the design element distribution map 71 as the search result.

Referring to FIGS. 7 and 8 together, it can be seen that the coverage area 723 includes three design elements. The design elements included in the coverage area 723 are the headlight design element 523, the email design element 524 and the battery design element 525. Among them, the headlight design element 523 and the battery design element 525 may be classified as the essential function design element related to safety. When the cluster UI design search unit 130 searches for a cluster UI design corresponding to the shape of the visible area further using the importance or function of the design element included in the coverage area, in FIG. 8, the design element distribution map 72 includes two essential function design elements but does not overlap the shape v4 of the visible area (i.e., positioned in an area invisible to the driver), and thus the cluster UI design 52 of the design element distribution map 72 may have lower similarity than the cluster UI design 51.

Figure 9:
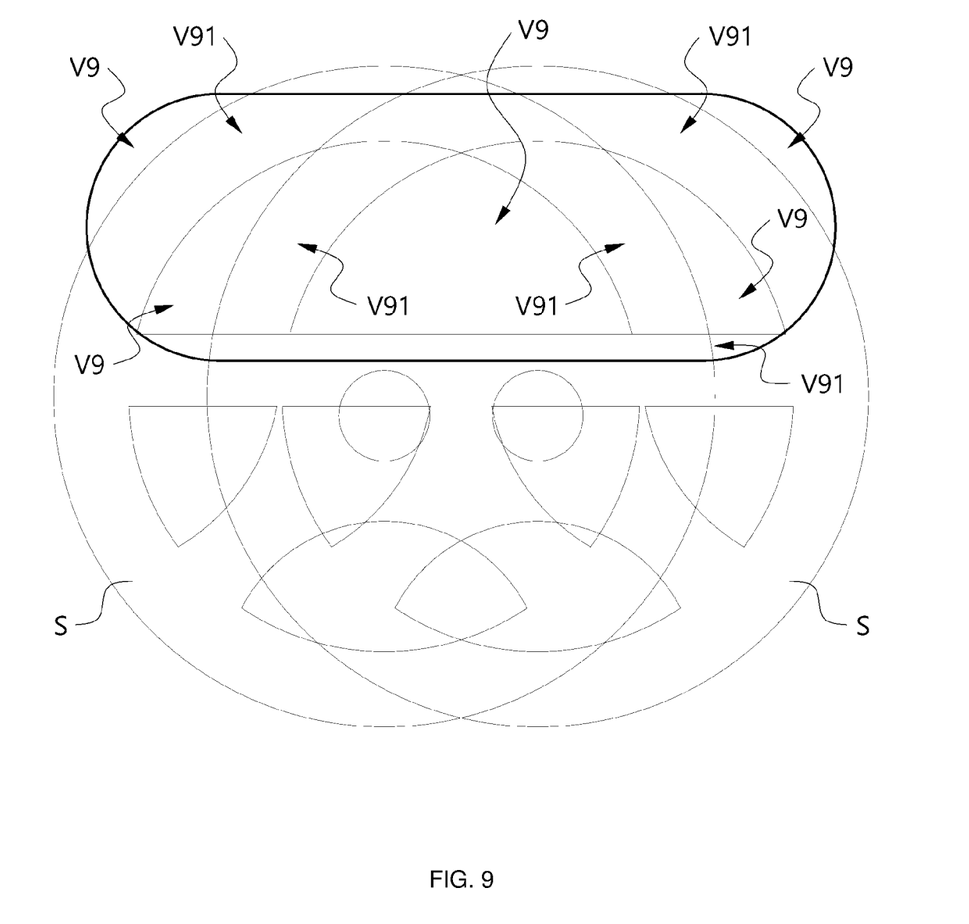
FIG. 9 is a diagram for describing monocular and binocular visible areas according to an embodiment of the present disclosure.

FIG. 9 is a diagram for describing monocular and binocular visible areas according to an embodiment of the present disclosure. Referring to FIG. 9, the binocular visible area V9 recognized by both eyes of the driver and the monocular visible area V91 recognized by either the left or right eye are shown.

In an embodiment, the eye position detection unit 110 may detect an eye position of each of the left and right eyes of the driver. Subsequently, the visible area determination unit 120 may divide the visible area in the cluster into a binocular visible area and a monocular visible area. Subsequently, when determining the relevance of the cluster UI design based on the similarity between the display information element distribution map and the shape of the visible area, the cluster UI design search unit 130 may determine the relevance by applying a lower weight for the monocular visible area than the binocular visible area. Since the monocular visible area is recognized by the driver less clearly than the binocular visible area, when the monocular visible area has a high density of display information, a larger amount of information may be invisible to the driver. In more detail, when it is assumed that a specific visible area overlaps each of a first cluster UI design and a second cluster UI design as much as the area of 100, in case that the range of overlap of the monocular visible area with the first cluster UI design occupies 20 (the range of overlap of the binocular visible area is 80), and the range of overlap of the monocular visible area with the second cluster UI design occupies 30 (the range of overlap of the binocular visible area is 70), the first cluster UI design may be determined to have higher relevance than the second cluster UI design.

Further, in other embodiment, the relevance between the visible area and the cluster UI design may be determined further using vision information of the left and right eyes of the driver. For example, when the left eye has higher vision than the right eye, the left eye visible area may be determined to have higher importance or similarity than the right eye visible area.

The method for recommending a cluster UI design using a distribution of design elements according to an embodiment of the present disclosure may be performed by the components of the apparatus 100 for recommending a cluster UI design using a distribution of design elements described above.

The method for recommending a cluster UI design using a distribution of design elements may include detecting an eye position of the driver from an image captured through the camera in the vehicle, determining a visible area in the cluster based on the detected eye position, the position of the cluster in the vehicle and the position of the steering wheel, searching for a cluster UI design related to the shape of the determined visible area in the database, and recommending the found cluster UI designs to the driver and applying a cluster UI design selected by the driver from the recommended cluster UI designs to the cluster in the vehicle.

Additionally, the method for recommending a cluster UI design using a distribution of design elements may include various embodiments implemented by each component of the apparatus for recommending a cluster UI design using a distribution of design elements described above.

The computer program according to an embodiment of the present disclosure may be stored in computer-readable recording media, and the computer program may include instructions for performing the method for recommending a cluster UI design using a distribution of design elements described above.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall in the technical protection scope of the present disclosure. Therefore, the true technical protection scope of the present disclosure should be defined as including other embodiments and other examples by the technical spirit of the appended claims and the equivalents to the appended claims.

The invention claimed is:

1. An apparatus for recommending a cluster user interface (UI) design using a distribution of design elements, comprising:
   an eye position detection unit to detect an eye position of a driver from an image captured through a camera in a vehicle;
   a visible area determination unit to determine a visible area in a cluster based on the detected eye position, a position of the cluster in the vehicle and a position of a steering wheel;
   a cluster UI design search unit to search for a cluster UI design related to a shape of the determined visible area in a database; and
   a cluster management unit to recommend the found cluster UI designs to the driver and apply a cluster UI design selected by the driver from the recommended cluster UI designs to the cluster in the vehicle.

2. The apparatus for recommending a cluster UI design using a distribution of design elements according to claim 1, further comprising:
   a design data processing unit to process the cluster UI design stored in the database,
   wherein the design data processing unit extracts position information of display information included in the cluster UI design stored in the database, and generates a display information distribution map in the cluster using the extracted position information of the display information, and
   the cluster UI design search unit selects the cluster UI design by comparing the generated display information distribution map with the shape of the visible area.

3. The apparatus for recommending a cluster UI design using a distribution of design elements according to claim 2, wherein the design data processing unit generates the display information distribution map by reflecting importance of each display information, and the importance of the display information is determined based on whether a function represented by the display information is related to safety.

4. The apparatus for recommending a cluster UI design using a distribution of design elements according to claim 3, wherein the cluster UI design search unit determines a relevance of the cluster UI design based on a similarity between the display information distribution map and the shape of the visible area and the importance of the display information, and
   the cluster management unit recommends a list of some of the cluster UI designs in the database based on the relevance to the driver.

5. The apparatus for recommending a cluster UI design using a distribution of design elements according to claim 2, wherein the eye position detection unit detects the eye position of each of left and right eyes of the driver, and
   the visible area determination unit divides the visible area in the cluster into a binocular visible area and a monocular visible area.

6. The apparatus for recommending a cluster UI design using a distribution of design elements according to claim 5, wherein the cluster UI design search unit determines a relevance of the cluster UI design based on a similarity between the display information distribution map and the shape of the visible area, and when determining the similarity, determines a weight for the monocular visible area to be lower than a weight for the binocular visible area, and
   the cluster management unit recommends a list of some of the cluster UI designs in the database to the driver based on the relevance.

7. A method for recommending a cluster user interface (UI) design using a distribution of design elements, performed by a computer, the method comprising:
   detecting an eye position of a driver from an image captured through a camera in a vehicle;
   determining a visible area in a cluster based on the detected eye position, a position of the cluster in the vehicle and a position of a steering wheel;
   searching for a cluster UI design related to a shape of the determined visible area in a database; and
   recommending the found cluster UI designs to the driver and applying a cluster UI design selected by the driver from the recommended cluster UI designs to the cluster in the vehicle.

8. A computer program stored in a computer-readable recording medium to perform the method according to claim 7, in combination with hardware.

* * * * *